UNITED STATES PATENT OFFICE.

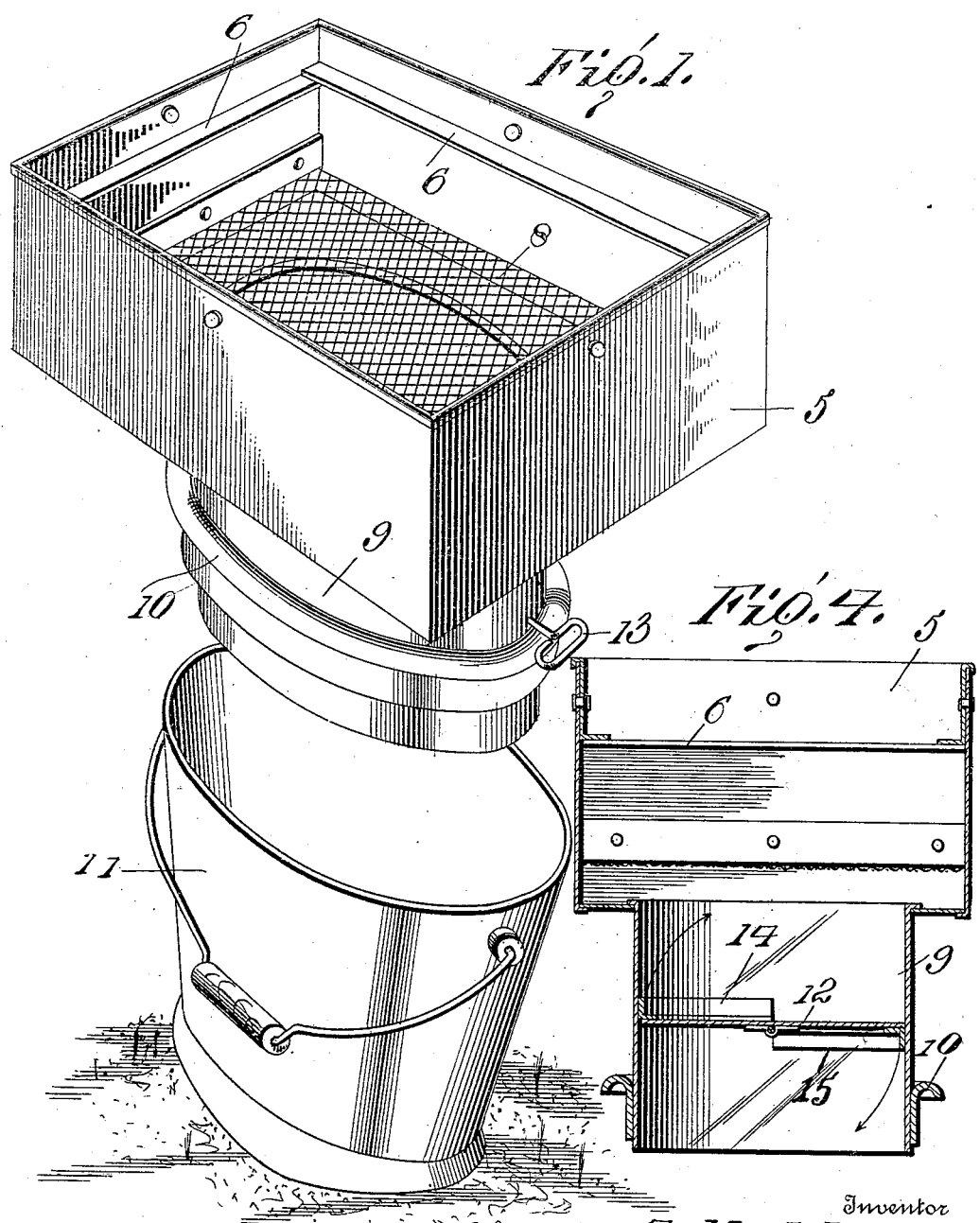

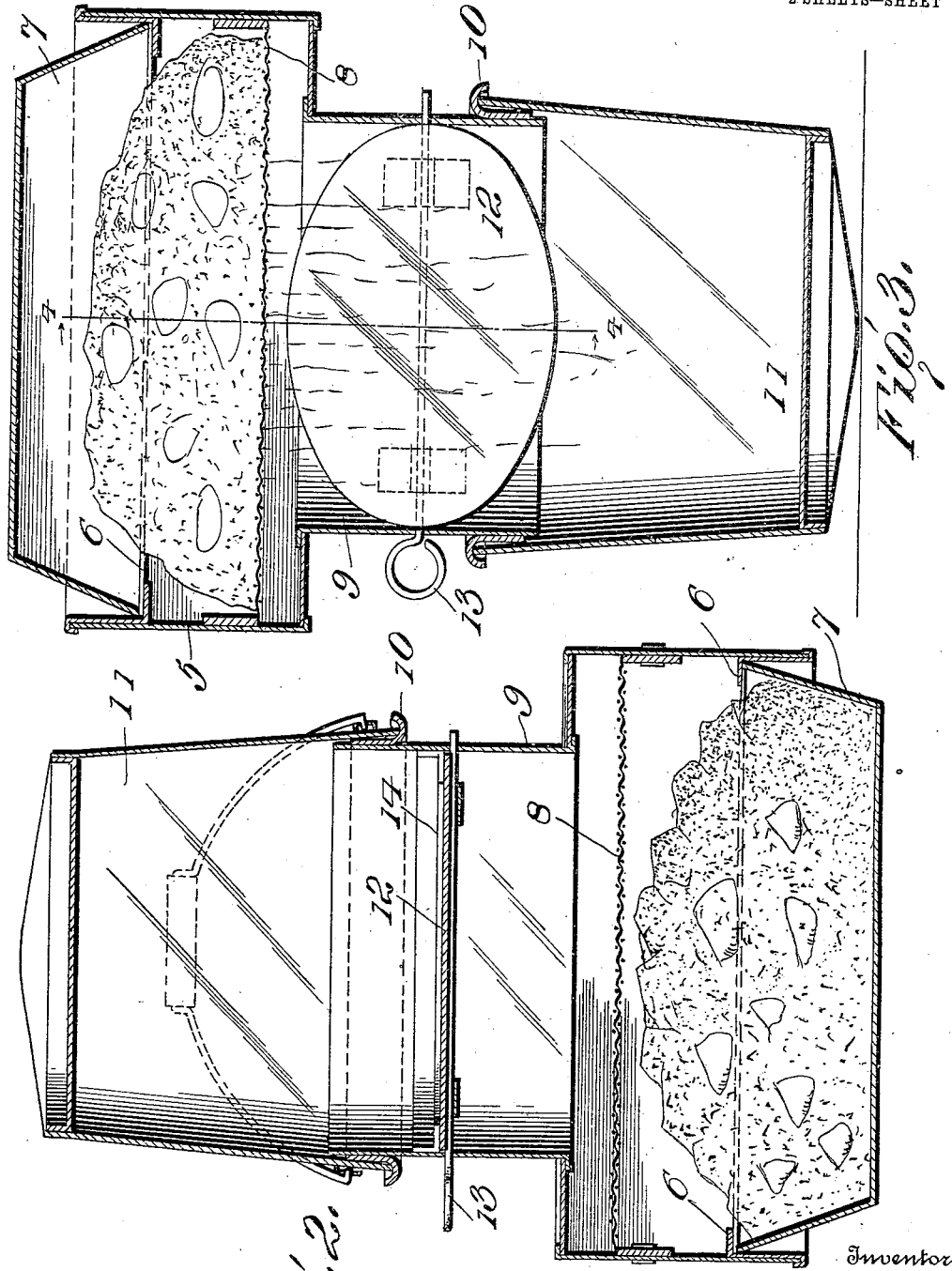

ACHILLE MARTEL, OF FALL RIVER, MASSACHUSETTS.

ASH-SIFTER.

961,148.  Specification of Letters Patent.  Patented June 14, 1910.

Application filed March 8, 1910. Serial No. 548,011.

*To all whom it may concern:*

Be it known that I, ACHILLE MARTEL, a citizen of the United States, residing at Fall River, in the county of Bristol and State of Massachusetts, have invented certain new and useful Improvements in Ash-Sifters, of which the following is a specification.

This invention relates to an ash sifter for domestic use and has for its object the formation of a sifter of this sort wherein the ordinary ash pan and dust bucket may be utilized and so combined with the sieve as to preclude the escape of dust in putting the ashes into the sieve or in taking the cinders therefrom.

The invention therefore consists in the structure of parts and in their combination substantially as hereinafter set forth and claimed.

In the accompanying drawings, which form a part of this specification, Figure 1 represents in perspective the improved sieve and below it a dust bucket; Fig. 2 represents in transverse vertical section the sieve applied to the ash pan and the dust bucket applied to the sieve; Fig. 3 is a similar section showing the parts inverted and ready for sifting; Fig. 4 is a vertical transverse section through the sieve alone, taken in the plane indicated by the line 4—4 in Fig. 3.

The sieve may be of any desired shape so long as its upper edge is adapted to fit the upper edge of the ash pan with which it is to be used, and so long as its lower edge is adapted to fit the upper edge of the dust bucket with which it is to be used.

In the drawings, 5 indicates the upper portion of the sieve and 6 a flange about the inner edge of the sieve, upon which the ash pan 7 is adapted to rest when the parts are inverted as in Fig. 3, and by which flange the sieve is adapted to rest upon the ash pan when first applied thereto, as represented in Fig. 2. As shown, the sieve and ash pan make a close joint. Below the flange 6 is located the screen 8. The lower portion of the sieve is indicated at 9 and about its lower end there is formed a flange, as 10, recurved to receive the upper edge of the dust bucket 11, Fig. 2, and to support the sieve upon the dust bucket when the parts are in the inverted position, as in Fig. 3. Within the lower portion of the sieve suitable means are provided for closing this end of the sieve. Such means may consist of a damper of any desired form, but, preferably, of a swinging damper, such as illustrated at 12. The handle for this damper is shown at 13. To make the damper fit as snugly as possible, thereby preventing dust from passing by it, a semi-flange, as 14, is located in the part 9 of the sieve above the damper and a corresponding semi-flange 15 is located on the opposite side of the portion 9 of the sieve below the damper. The parts of the sieve may be put together in any suitable manner, the flange 6, however, is preferably made and attached to the body of the sieve as illustrated, said flange being provided with a rolled upper edge for engagement with the upper edge of the part 5 of the sieve and having its lower edge bent outwardly, as shown, to receive the ash pan as described.

Although the sieve and its added parts, the ash pan and the dust bucket, may be agitated in any suitable manner to separate the dust from the cinders, the dust bucket itself is preferably provided with a rocker bottom, such as indicated, whereby the ash sifter may be oscillated and the dust separated from the cinders.

In using the ash sifter described no dust whatever need escape into the room if ordinary care is taken. In using the sifter the ash pan is taken from the stove and placed upon the floor. The sifter is then inverted and placed upon the upper edge of the ash pan, as seen in Fig. 2. The damper 12 is closed, as seen in Figs. 2 and 4. The dust bucket 11 may then be applied to the sieve, as indicated in Fig. 2, or the sieve with the ash pan may be inverted and applied to the bucket, as in Fig. 3. If the bucket is applied as in Fig. 2, then the sifter as a whole, consisting of the three parts, sieve, ash pan and bucket, are to be inverted into the position seen in Fig. 3. The damper 13 may be opened before sifting, if desired, and then by rocking the sifter the dust will be separated from the cinders and drop into the bucket. When such separation has been effected the damper 13 must be closed, when, by taking the sieve, with its superimposed ash pan, from the bucket, the two still together may be inverted, when the cinders will fall into the ash pan, the closed damper preventing any dust from flying into the room during the fall of the cinders into the pan. With the damper tightly closed the sifting may be effected before placing the sieve, with its superimposed ash pan upon the dust bucket, in which case the sieve may be shaken in the hands, then, by placing the sieve upon the dust bucket and opening the damper, the dust will fall into said bucket. The damper may then be closed and the cinders turned into the pan as above described.

The invention claimed is:—

1. In a portable ash sifter, the combination with an ash pan, a dust bucket, a sieve provided near its upper end with an interior flange adapted to receive and support the edge of the ash pan, and having a tubular extension adapted to extend within the ash bucket, and an exterior flange on the extension adapted to take over the upper edge of the dust bucket, whereby closed joints are made between the parts, for the purpose set forth.

2. In an ash sifter, the combination with an ash pan, a dust bucket, and a sieve adapted to be closed at its upper end by the inverted ash pan and provided with an interior flange to receive the edge of said pan, an exterior flange adjacent the lower end of said sieve and adapted to take over the edge of said bucket, and a damper arranged to close the passage to said bucket, for the purpose set forth.

3. In a portable ash sifter, the combination with an ash pan, a dust bucket, and a sieve provided in its upper end with a flange adapted to receive and support the upper edge of the ash pan, a tubular extension on said sieve adapted to enter the dust bucket, semi-circular, reversely-mounted, L-shaped flanges in said extension, and a damper mounted between said flanges whereby said damper seats with one of its side edges upon one of said flanges and the other below the other flange, whereby a dust-proof closure between the sifter and the bucket is secured, for the purposes set forth.

In testimony whereof I affix my signature in presence of two witnesses.

ACHILLE MARTEL.

Witnesses:
  MERIE CATE,
  GEORGES PINEAU.